J. SUDUL.
BIRD TRAP.
APPLICATION FILED JAN. 2, 1918.
1,345,716.
Patented July 6, 1920.
2 SHEETS—SHEET 1.
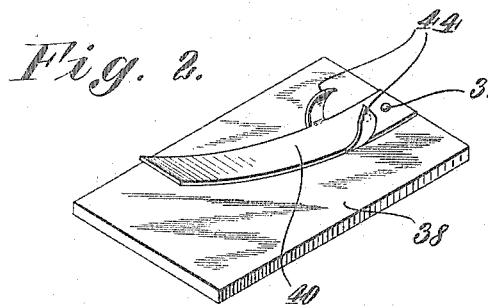
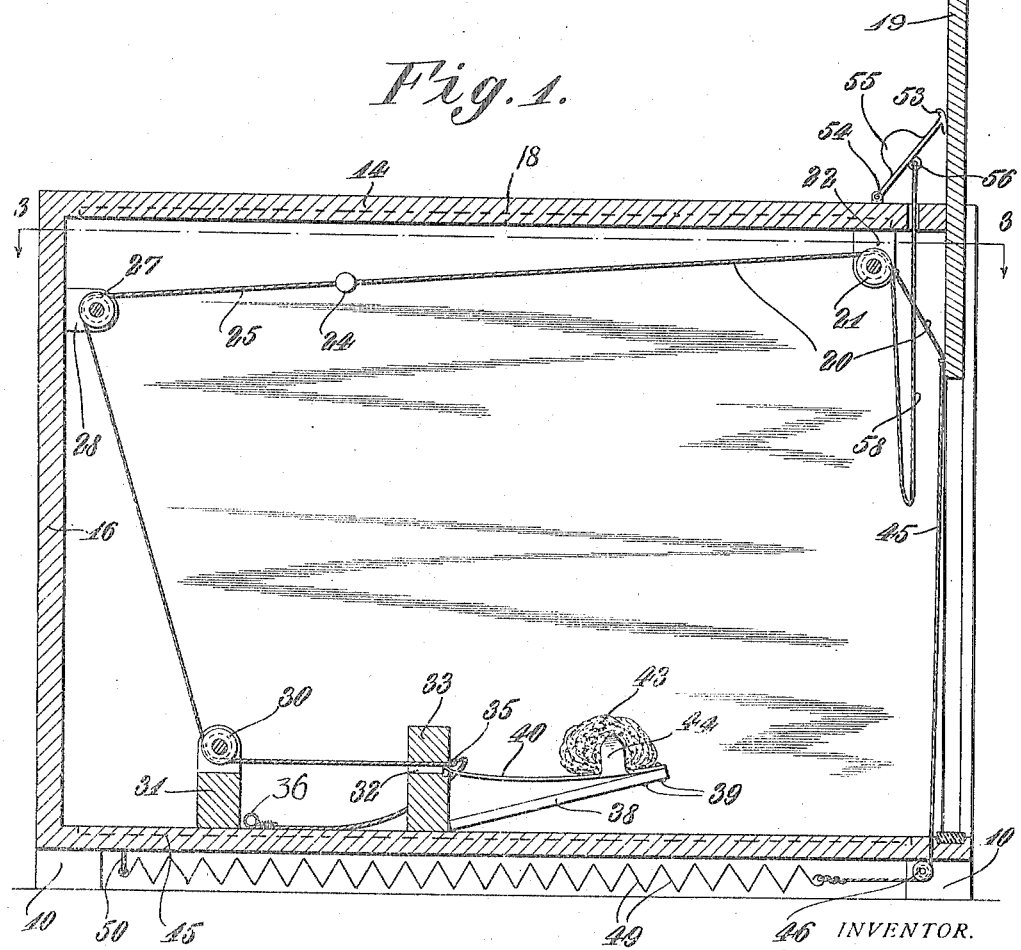
INVENTOR.
John Sudul.
BY Oscar Gill
HIS ATTORNEY

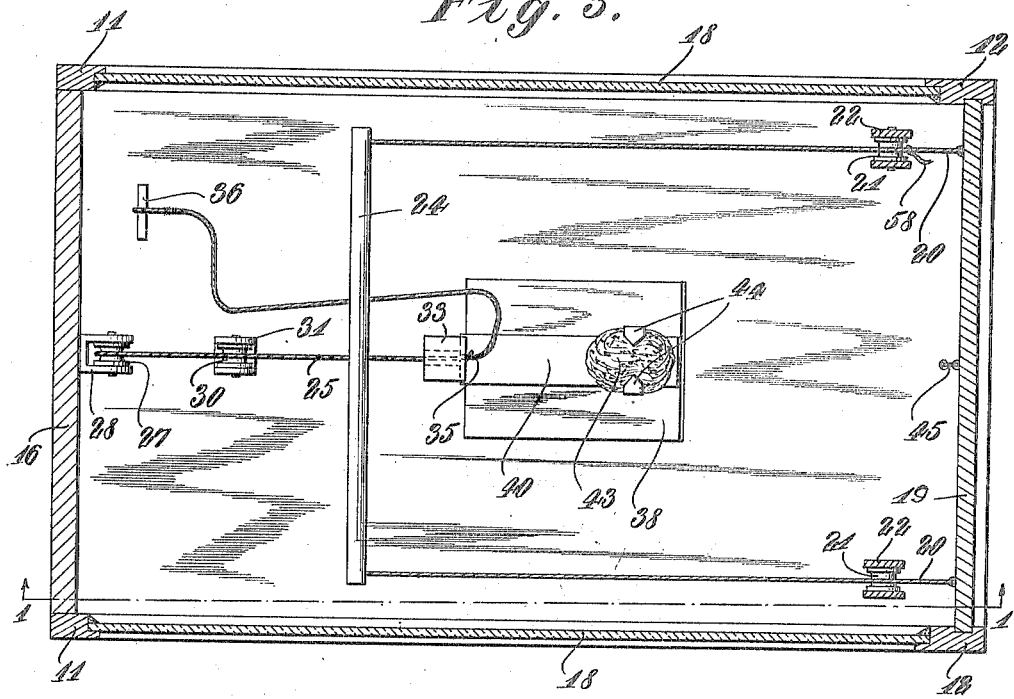

UNITED STATES PATENT OFFICE.

JOHN SUDUL, OF CLEVELAND, OHIO.

BIRD-TRAP.

1,345,716. Specification of Letters Patent. Patented July 6, 1920.

Application filed January 2, 1918. Serial No. 209,947.

*To all whom it may concern:*

Be it known that I, JOHN SUDUL, a subject of the Emperor of Austria, resident of Cleveland, county of Cuyahoga, and State of Ohio, have invented certain new and useful Improvements in Bird-Traps, of which the following is a specification.

This invention relates to improvements in traps, and particularly to types employed in catching birds, small animals and the like, and has as its special object the provision of means whereby upon the entry of a live object the inlet is instantaneously closed by a gate, confining the entered bird or animal therewithin.

Another object is to provide means whereby the gate is secured when in a closed position so that it cannot be opened from the interior.

These and other like objects are attained by the novel construction and combination of parts hereinafter described and shown in the accompanying drawings, forming a material part of this specification and in which—

Figure 1 is a vertical sectional view taken on line 1—1 of Fig. 3 and showing an embodiment of the invention.

Fig. 2 is a perspective view of the trigger and movable platform used in the construction.

Fig. 3 is a horizontal sectional view taken on line 3—3 of Fig. 1.

Fig. 4 is a fragmental perspective view indicating the gate locking means, and

Fig. 5 is a perspective view of the trigger engaging means.

The invention comprises a hollow rectangular frame, mounted at the bottom upon supports 10, from which rise rigid corner uprights 11 and 12, respectively at the rear and front, which are engaged with the top and bottom respectively 14, and 15, and a rear plate 16, while between the corner elements 11 and 12, on the sides are transparent plates 18, for the provision of light.

The front uprights 12 are grooved to receive a sliding gate 19 freely movable vertically therein and to which are attached cords 20, running over rollers 21, supported by brackets 22 and secured to the cover 14.

The opposite ends of the cords 20 are engaged with a bar 24, at the center of which is attached another cord 25, passing over a pulley 27, rotatable in a bracket 28, fastened to the rear wall 16, of the structure, the cord passing below another pulley 30, rotatable in a bracket 31, affixed to the bottom plate 15 and then through a passage 32, in the block 33 also secured to the bottom plate 15, where a knot 35, is formed, the extending end of the cord being secured to a loose stop 36 to prevent complete withdrawal of the cord through the passage 32.

Trigger 38 has secured to it by the rivets 39, a spring 40, the free end of which is adapted to engage in a recess 42, formed across the block 33 at the end of the passage 32, the extreme outer edge of the spring making contact with the knot 35, so as to prevent the knot from being passed through the passage when the trap is in a set or operative condition. A pair of spring arms 44 are formed with the spring 40, which are adapted to engage with a bait or lure 43, so as to hold the same securely near the end of the trigger 38.

It will be obvious upon touching the bait or lure, the spring 40, will be displaced from the recess 42, allowing the knot 35 to pass through the passage 32, and permit the gate 18 to drop, barring the entrance to the structure. This action is accelerated by means of a cord 45 secured to the lower part of the gate and which is passed around a pulley 46, in the supports 10, and connected with a spirally wound tension spring 49, secured at one end by the pin 50, set in the bottom plate or floor 15.

The upper edge 52, of the gate 19 is beveled to engage with the hook 53, secured in the hinge 54, arranged on the upper surface of the top plate 14, the hook having upon it a projection 55 by means of which it may be readily manipulated and opposite the projection 55, is an eye 56, engaged with a cord 58, the free end of which is attached to one of the cords 20 in such manner as to prevent entanglement.

In operation the gate is raised, the spring 40 extended, and the trigger 38 is placed so as to make contact with the upper surface of the floor 15 and the outer surface of the block 33 at their junction, the knot 35 being drawn through the passage 32, engaged by the edge of the spring 40 and held until such time as the trigger 38 is disturbed, by making contact with the lure 43, causing the trigger to become loosened permitting the gate to descend inclosing whatever object may be within the structure and it is automatically locked by engagement with the hook 53, so that it cannot be operated from the interior.

Having thus described my invention what I claim as new and desire to secure by Letters Patent, is—

1. In a trap, the combination with a hollow structure having an entrance and a sliding gate adapted to close the entrance, of a cord adapted to hold said gate in a raised position, a block through which said cord passes, a trigger engageable within said structure against said block, a spring element secured to said trigger, adapted to engage with said cord, means for securing a lure to said trigger, and a spring adapted to close said gate upon the dislocation of said trigger.

2. In a trap, the combination with a hollow structure, having an entrance and a sliding gate adapted to close the entrance, of a pair of cords attached to said gate, said cords being extended within, close to the upper portion of the structure, a bar connected with said cords, another cord engaging centrally with said bar, and passing through the lower portion of said structure, a block arranged upon the bottom of said structure having an opening through which said cord passes, means for engaging said cord within said opening, means permitting the disengagement of said engaging means, said means being operated by a lure, a spring for accelerating the movement of said gate, and means for locking said gate when in a lowered position thereby preventing it from being raised from the interior.

In testimony whereof I have affixed my signature.

JOHN SUDUL.